United States Patent
Chasser et al.

(10) Patent No.: US 9,598,597 B2
(45) Date of Patent: Mar. 21, 2017

(54) WATERBORNE COATING COMPOSITIONS AND HEAT SENSITIVE SUBSTRATES COATED THEREWITH

(71) Applicant: PPG INDUSTRIES OHIO, INC., Cleveland, OH (US)

(72) Inventors: Anthony M Chasser, Allison Park, PA (US); Richard J Sadvary, Allison Park, PA (US); Shanti Swarup, Allison Park, PA (US); Xiangling Xu, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 14/953,518

(22) Filed: Nov. 30, 2015

(65) Prior Publication Data

US 2016/0075907 A1 Mar. 17, 2016

Related U.S. Application Data

(62) Division of application No. 13/804,827, filed on Mar. 14, 2013, now abandoned.

(51) Int. Cl.
| | |
|---|---|
| C09D 133/14 | (2006.01) |
| C09D 175/04 | (2006.01) |
| C09D 129/12 | (2006.01) |
| C09D 175/14 | (2006.01) |
| C09D 147/00 | (2006.01) |
| C09D 5/02 | (2006.01) |
| C08K 5/25 | (2006.01) |

(52) U.S. Cl.
CPC .......... *C09D 133/14* (2013.01); *C09D 5/02* (2013.01); *C09D 129/12* (2013.01); *C09D 147/00* (2013.01); *C09D 175/04* (2013.01); *C09D 175/14* (2013.01); *C08K 5/25* (2013.01); *Y10T 428/31511* (2015.04); *Y10T 428/31551* (2015.04)

(58) Field of Classification Search
CPC ...... C09D 5/02; C09D 133/14; C09D 175/04; C09D 129/12; C09D 147/00; C09D 5/028; C09D 5/25; C09D 175/16; C08F 299/065
See application file for complete search history.

(56) References Cited

U.S. PATENT DOCUMENTS

| | | | |
|---|---|---|---|
| 5,348,997 A | 9/1994 | Kato et al. | |
| 5,432,229 A * | 7/1995 | Aoki | C08F 8/32 524/401 |
| 5,472,996 A | 12/1995 | Hayashi et al. | |
| 5,571,861 A | 11/1996 | Klein et al. | |
| 5,614,582 A | 3/1997 | Hori et al. | |
| 5,623,016 A | 4/1997 | Klein et al. | |
| 5,912,293 A | 6/1999 | Stockwell et al. | |
| 6,306,947 B1 * | 10/2001 | Morishima | C08F 283/006 524/457 |
| 7,531,074 B2 | 5/2009 | Purdy et al. | |
| 9,127,125 B2 | 9/2015 | Hartig et al. | |
| 2001/0024693 A1 | 9/2001 | Morimoto et al. | |
| 2002/0103278 A1 | 8/2002 | Krajnik et al. | |
| 2003/0050371 A1 | 3/2003 | Kim et al. | |
| 2003/0139496 A1 * | 7/2003 | Sugishima | C08F 8/30 524/86 |
| 2004/0159555 A1 | 8/2004 | Purdy et al. | |
| 2006/0030651 A1 | 2/2006 | Kubish et al. | |
| 2009/0117396 A1 | 5/2009 | Furusawa et al. | |
| 2011/0117378 A1 | 5/2011 | Kawaguchi et al. | |
| 2011/0151128 A1 | 6/2011 | Boggs et al. | |
| 2011/0177352 A1 | 7/2011 | Ambrose et al. | |
| 2011/0300389 A1 | 12/2011 | Kitagawa et al. | |
| 2012/0021228 A1 | 1/2012 | Kitagawa et al. | |
| 2014/0377468 A1 * | 12/2014 | Swarup | C08G 18/4854 427/385.5 |

FOREIGN PATENT DOCUMENTS

| | | |
|---|---|---|
| CN | 101838370 A | 9/2010 |
| GB | 2242682 A | 10/1991 |
| JP | 1995082456 A | 3/1995 |
| JP | 10-139839 | 5/1998 |
| WO | 97/47401 | 12/1997 |
| WO | 2010/018872 A1 | 2/2010 |
| WO | 2011/127641 A1 | 10/2011 |
| WO | WO2013/181068 A2 | 12/2013 |

OTHER PUBLICATIONS

Ansdell, Paint and Surface Coatings—Chapter 10 Automotive Paints, 1999, Woodhead Publishing Ltd., Second Edition, pp. 411-491.

* cited by examiner

*Primary Examiner* — Satya Sastri
(74) *Attorney, Agent, or Firm* — Krisanne Shideler

(57) ABSTRACT

The present invention is directed to a coated substrate comprising:
A) a heat sensitive substrate having a heat distortion temperature less than 120 degrees C., and
B) a coating layer deposited on at least one surface of the substrate, wherein the coating layer is deposited from a waterborne coating composition comprising:
 (a) a continuous phase comprising water, and
 (b) a dispersed phase comprising:
  (i) optional pigments;
  (ii) polymeric particles containing carboxylic acid functionality prepared from the polymerization of a mixture of ethylenically unsaturated compounds including ethylenically unsaturated monomers; and
  (iii) a polycarbodiimide or a polyhydrazide. The present invention is further directed to the waterborne coating compositions used to prepare the coated substrates.

8 Claims, No Drawings

WATERBORNE COATING COMPOSITIONS AND HEAT SENSITIVE SUBSTRATES COATED THEREWITH

CROSS-REFERENCE TO RELATED APPLICATIONS

This patent application is a Divisional of U.S. patent application Ser. No. 13/804,827 filed Mar. 13, 2013, entitled: "HEAT SENSITIVE SUBSTRATES COATED WITH WATERBORNE COATING COMPOSITIONS", the entirety of which is incorporated herein by reference.

FIELD OF THE INVENTION

The present invention relates to waterborne film-forming compositions and coated substrates comprising heat sensitive substrates having the waterborne film-forming compositions deposited thereon.

BACKGROUND OF THE INVENTION

Automotive manufacturers are currently under pressure to increase the fuel economy of the vehicles they produce, and to decrease their carbon footprint in the manufacturing process. Challenges exist in doing both in an economical fashion while maintaining quality.

Automotive manufacturers are looking at lighter weight materials for vehicle body parts as well as streamlined processing, among other approaches.

Lighter weight materials typically include plastic and composites, but such substrates are often sensitive to the high temperatures usually needed to cure the protective and decorative coatings applied to the substrates. Many of the proposed plastics deform at temperatures as low as 250° F.

It would be desirable to provide lightweight substrates coated with compositions that are curable at temperatures which the substrates can withstand without deformation or loss of other properties.

SUMMARY OF THE INVENTION

The present invention is directed to a coated substrate comprising:
A) a heat sensitive substrate having a heat distortion temperature less than 120 degrees C., and
B) a coating layer deposited on at least one surface of the substrate, wherein the coating layer is deposited from a waterborne coating composition comprising:
  (a) a continuous phase comprising water, and
  (b) a dispersed phase comprising:
    (i) optional pigments;
    (ii) polymeric particles containing carboxylic acid functionality prepared from the polymerization of a mixture of ethylenically unsaturated compounds including ethylenically unsaturated monomers; and
    (iii) a polycarbodiimide.

The present invention further provides a coated substrate comprising:
A) a heat sensitive substrate having a heat distortion temperature less than 120 degrees C., and
B) a coating layer deposited on at least one surface of the substrate, wherein the coating layer is deposited from a waterborne coating composition comprising:
  (a) a continuous phase comprising water, and
  (b) a dispersed phase comprising:
    (i) pigments;
    (ii) polymeric particles prepared from the polymerization of a mixture of ethylenically unsaturated compounds including ethylenically unsaturated monomers comprising from:
      (A) 2 to 30 percent by weight of a multi-ethylenically unsaturated monomer and
      (B) at least 30 percent by weight of an aldo or keto group-containing ethylenically unsaturated monomer, the percentages by weight being based on total weight of the ethylenically unsaturated monomers; and
    (iii) a polyhydrazide. The present invention is further directed to the waterborne coating compositions used to prepare the coated substrates.

DETAILED DESCRIPTION OF THE INVENTION

Other than in any operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used in this specification and the appended claims, the articles "a," "an," and "the" include plural referents unless expressly and unequivocally limited to one referent.

The various embodiments and examples of the present invention as presented herein are each understood to be non-limiting with respect to the scope of the invention.

As used in the following description and claims, the following terms have the meanings indicated below:

By "polymer" is meant a polymer including homopolymers and copolymers, and oligomers. By "composite material" is meant a combination of two or more differing materials.

The term "curable", as used for example in connection with a curable composition, means that the indicated composition is polymerizable or cross linkable through functional groups, e.g., by means that include, but are not limited to, thermal (including ambient cure), catalytic, electron beam, chemical free-radical initiation, and/or photo-initiation such as by exposure to ultraviolet light or other actinic radiation.

The term "cure", "cured" or similar terms, as used in connection with a cured or curable composition, e.g., a "cured composition" of some specific description, means that at least a portion of the polymerizable and/or crosslinkable components that form the curable composition is polymerized and/or crosslinked. Additionally, curing of a polymerizable composition refers to subjecting said composition to curing conditions such as but not limited to thermal curing, leading to the reaction of the reactive functional groups of the composition, and resulting in polymerization and formation of a polymerizate. When a polymerizable composition is subjected to curing conditions, following polymerization and after reaction of most of the reactive groups occurs, the rate of reaction of the remaining unreacted reactive groups becomes progressively slower. The polymerizable composition can be subjected to curing conditions until it is at least partially cured. The term "at least partially cured" means subjecting the polymerizable composition to curing conditions, wherein reaction of at least a portion of the reactive groups of the composition occurs, to form a polymerizate. The polymerizable composition can also be subjected to curing conditions such that a substantially complete cure is attained and wherein further curing results in no significant further improvement in polymer properties, such as hardness.

The term "reactive" refers to a functional group capable of undergoing a chemical reaction with itself and/or other functional groups spontaneously or upon the application of heat or in the presence of a catalyst or by any other means known to those skilled in the art, By "essentially free" of a material is meant that a composition has only trace or incidental amounts of a given material, and that the material is not present in an amount sufficient to affect any properties of the composition.

The present invention provides coated substrates comprising heat sensitive substrates and a coating layer deposited on at least one surface of the substrate. A heat-sensitive substrate may be defined as any substrate that has a change in physical and/or chemical properties when exposed to a certain threshold temperature, usually for a specific period of time. For the purposes of the present invention, by "heat sensitive" is meant that the substrate demonstrates a heat distortion temperature less than 120° C., usually less than 100° C. Suitable substrates include elastomeric or plastic substrates such as those that are found on motor vehicles. By "plastic" is meant any of the common thermoplastic or thermosetting synthetic nonconductive materials, including thermoplastic olefins such as polyethylene and polypropylene, thermoplastic urethane, polycarbonate, thermosetting sheet molding compound, reaction-injection molding compound, acrylonitrile-based materials, nylon, and the like. Composite substrates comprising a resinous matrix such as one or more of polypropylene, polybutylene terephthalate, polystyrene, polyaniline, polypyrrole, polyepoxide, poly(methyl methacrylate), polyurethane, and polycarbonate, reinforced with fibers typically oriented as strands, multi-ply yarns, woven sheets, or braids, and comprising at least one of stainless steel fibers, copper fibers, nickel fibers, silver fibers, aluminum fibers, glass fibers, and carbon fibers, are also suitable substrates.

The substrates are most often composite or plastic exterior automotive substrates; in particular, automotive body parts such as hoods, lids, fenders, door panels, roofs, bumpers, and the like.

Before depositing any treatment or coating compositions upon the surface of the substrate, it is common practice, though not necessary, to remove foreign matter from the surface by thoroughly cleaning and degreasing the surface. Such cleaning typically takes place after forming the substrate into an end-use shape. The surface of the substrate can be cleaned by physical or chemical means, such as mechanically abrading the surface or cleaning/degreasing with commercially available alkaline or acidic cleaning agents that are well known to those skilled in the art, such as sodium metasilicate and sodium hydroxide. A non-limiting example of a cleaning agent is CHEMKLEEN 163, an alkaline-based cleaner commercially available from PPG Industries, Inc.

Following the cleaning step, the substrate may be rinsed with deionized water or an aqueous solution of rinsing agents in order to remove any residue. The substrate can be air dried, for example, by using an air knife, by flashing off the water by brief exposure of the substrate to an elevated temperature (provided the temperature is not so high as to induce deformation) or by passing the substrate between squeegee rolls.

The substrate to which the coating composition is applied may be a bare, cleaned surface; it may be pretreated with one or more pretreatment compositions, and/or prepainted with one or more coating compositions, primers, etc., applied by any suitable method.

The coating layer may be deposited on one or more surfaces of the substrate. In certain embodiments of the present invention, the coating layer is deposited from a waterborne coating composition comprising:
(a) a continuous phase comprising water, and
(b) a dispersed phase comprising:
  (i) optional pigments;
  (ii) polymeric particles containing carboxylic acid functionality prepared from the polymerization of a mixture of ethylenically unsaturated compounds including ethylenically unsaturated monomers; and
  (iii) a polycarbodiimide.

The waterborne coating composition may be applied as a transparent clear coat, in which case it is free of any pigments. Alternatively, the coating composition may contain colorants conventionally used in surface coatings, rendering them translucent or opaque. As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions, rendering the coating composition translucent or opaque. A colorant may include, for example, a finely divided solid powder that is insoluble but wettable under the conditions of use. A colorant can be organic or inorganic and can be agglomerated or non-agglomerated. Colorants can be incorporated into the coatings by grinding or simple mixing. Colorants can be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DP- PBO red"), titanium dioxide, carbon black and mixtures thereof. The terms "pigment" and "colored filler" can be used interchangeably.

Example dyes include, but are not limited to, those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene, aluminum, quinacridone, thiazole, thiazine, azo, indigoid, nitro, nitroso, oxazine, phthalocyanine, quinoline, stilbene, and triphenyl methane.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticies can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in U.S. application Ser. No. 10/876,031 filed Jun. 24, 2004, which is incorporated herein by reference, and U.S. Provisional Application No. 60/482,167 filed Jun. 24, 2003, which is also incorporated herein by reference.

Example special effect compositions that may be used in the coating composition include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as reflectivity, opacity or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain non-limiting embodiments, a photosensitive composition and/or photochromic composition, which reversibly alters its color when exposed to one or more light sources, can be used in the coating of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one non-limiting embodiment, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In certain embodiments, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with a non-limiting embodiment of the present invention, have minimal migration out of the coating. Example photosensitive compositions and/or photochromic compositions and methods for making them are identified in U.S. application Ser. No. 10/892,919 filed Jul. 16, 2004 and incorporated herein by reference.

In general, the colorant can be present in the coating composition in any amount sufficient to impart the desired property, visual and/or color effect. The colorant may comprise from 1 to 65 weight percent of the present compositions, such as from 3 to 40 weight percent or 5 to 35 weight percent, with weight percent based on the total weight of the compositions.

The curable aqueous compositions that are useful in the present invention comprise a dispersion of polymeric particles in a continuous aqueous phase. The polymeric particles are prepared from the polymerization of a mixture of ethylenically unsaturated compounds including ethylenically unsaturated monomers that may comprise at least one multi-ethylenically unsaturated monomer.

The dispersion of polymeric particle can be made by conventional oil in water emulsion polymerization techniques typically to a solids content of 20 to 50 percent by weight. The polymerization can be conducted using conventional additives such as emulsifiers, protective colloids, free radical initiators and chain transfer agents. Generally, the polycarbodiimide is added after the polymerization. The polymeric particles have a mean particle size (diameter) of from 40 to 250 nanometers.

The multi-ethylenically unsaturated monomers are typically diethylenically or triethylenically unsaturated monomers. Suitable monomers include divinyl aromatics such as divinyl benzene, diacrylates and dimethacrylates of $C_{2-24}$ diols such as butane diol and hexane diol, divinyl ethylene urea and other divinyl ureas, and diallyl and triallyl compounds such as diallyl phthalate and triallyl isocyanurate. The amount of multi-ethylenically unsaturated monomers is 2 to 30 percent by weight based on total weight of ethylenically unsaturated monomer. The inclusion of such monomers causes crosslinking between the polymer backbones, which is important because such crosslinking allows the coating to hold out any subsequently applied coatings, maintaining appearance and physical properties. Amounts less than 2 percent by weight provide insufficient crosslinking, whereas amounts greater than 30 percent are also undesirable because the composition becomes very viscous and difficult to process.

Besides the multi-ethylenically unsaturated monomers mentioned above, alkyl esters of (meth)acrylic acid are usually used in the preparation of the polymeric particles. Typically, these monomers contain from at least 4, such as 4 to 10 carbon atoms, and at least 6, such as 6 to 10 carbon atoms in the alkyl group. These monomers are typically present in amounts of 4 to 40 percent by weight based on total weight of ethylenically unsaturated monomers. These monomers provide for low glass transition temperatures ($T_g$) in the cured basecoat layers, which is desirable because of road stone and chip resistance, $T_g$s less than 25° C. are desirable.

The $T_g$ can be measured on a cured film of the polymeric particles by Differential Scanning Colorimetry (rate of heating of 10° C./minute with the $T_g$ taken at the first inflection point). Examples of suitable monomers include isooctyl acrylate, 4-methyl-2-pentyl acrylate, 2-methyl-butyl acrylate, isoamyl acrylate, sec-butyl acrylate, n-butyl acrylate, 2-ethylhexyl acrylate, isodecyl methacrylate, isononyl acrylate, isodecyl acrylate, and the like, including mixtures thereof.

Other ethylenically unsaturated monomers may also be used such as hydroxyalkyl esters of (meth)acrylic acid such as hydroxyethyl and hydroxypropyl (meth)acrylate; alkyl esters of (meth)acrylic acid having 1 to 2 carbon atoms in the alkyl group such as methyl (meth)acrylate; acid group containing monomers such as (meth)acrylic acid; and vinyl aromatic monomers such as styrene and vinyl toluene. Amounts of 0 to 60 percent are typical, Besides the ethylenically unsaturated monomers, other ethylenically unsaturated compounds may be used. An example of such a compound is an ethylenically unsaturated polyurethane. These materials can be prepared by reaction of a polyisocyanate, usually a diisocyanate with a polyol, a polyol such as a diol containing carboxylic acid groups, optionally another polyol having a number average molecular weight of 60 to 10,000 and a hydroxyl group-containing ethylenically unsaturated monomer.

Among the polyisocyanates that may be used are aliphatic including cycloaliphatic diisocyanates such as tetramethylene diisocyanate, 2,2,4-trimethylhexane diisocyanate, hexamethylene diisocyanate, lysine diisocyanate, as well as alicyclic diisocyanates such as 1,4-cyclohexylene diisocyanate, 4,4'-dicyclohexylmethane diisocyanate, isophorone diisocyanate and the like.

As polyols, there may be used low molecular weight glycols, high molecular weight glycols, such as polyether polyols, and the like individually, or mixtures of high molecular weight glycols and low molecular weight glycols. Examples of low molecular weight glycols are ethylene glycol, diethylene glycol, triethylene glycol, 1,2-propylene glycol, 1,3-butylene glycol, tetramethylene glycol, hexamethylene glycol, and the like, which may be used individually or in admixture.

Examples of high molecular weight polyglycols, are polyethylene glycol, polypropylene glycol, polytetramethylene glycol, and the like.

Examples of carboxylic acid group-containing polyols, are 2,2-dimethylol propionic acid, 2,2-dimethylol butyric acid, 2,2-dimethylol valeric acid, and the like. Typically, the carboxylic acid group-containing polyols are present in amounts of 5 to 30 percent by weight based on weight of resin solids of the ethylenically unsaturated polyurethane. The acid value of the ethylenically unsaturated polyurethane is typically about 20 to 60 based on resin solids of the ethylenically unsaturated polyurethane.

Examples of hydroxyl group-containing ethylenically unsaturated monomers are (meth)acrylates such as 2-hydroxyethyl (meth)acrylate, hydroxypropyl (meth)acrylate, hydroxybutyl (meth)acrylate, and the like.

Also, allyl compounds such as allyl alcohol may be used.

The synthesis reaction of the ethylenically unsaturated polyurethane resin may be carried out with one or more of the acrylic monomers such as 2-ethylhexyl (meth)acrylate acting as a reactive solvent. Also, an unreactive organic solvent that is inactive to the isocyanate group and which has high compatibility with water, such as dioxane, acetone, methyl ethyl ketone, methyl isobutyl ketone. N-methyl pyrrolidone, tetrahydrofuran and the like may be used.

The proportions of the hydroxyl group-containing reactants may be changed variously but the equivalent ratio between isocyanate groups and hydroxyl groups in all components is from 1:1 to 1:1.5 such as 1:1 to 1:1.3. The amount of the hydroxyl group-containing ethylenically unsaturated monomer may be 0.01-1, usually 0.02-0.8 equivalent to 1 equivalent of isocyanate group.

Preparation of the ethylenically unsaturated polyurethane resin is not limited to any one method, and diisocyanate, a polyol, a carboxyl group-containing diol and a hydroxyl group-containing ethylenic unsaturated monomer may be reacted simultaneously, or the resin may be prepared by multi-step reaction method. In the latter case, a diisocyanate is reacted with a part of the polyol and a carboxyl group-containing diol to synthesize a prepolymer having the isocyanate end, and thereafter the remainder of the polyol and a hydroxyl group-containing ethylenic unsaturated monomer are reacted with the prepolymer. Generally, the reaction may be carried out at the temperature of 40-180° C., usually 60-130° C.

In order to accelerate the reaction, there may be used catalysts generally used in the conventional urethane reactions, such as triethylamine, N-ethyl morpholine, triethyldiamine and the like, as well as tin type catalysts such as dibutyl tin dilaurate, dioctyl tin dilaurate and the like. Furthermore, in order to prevent polymerization of an ethylenic unsaturated compound during the urethane reaction, there may be used hydroquinone, hydroquinone monomethyl ether, p-benzoquinone and the like.

For enhanced dispersion stability, the polymeric particles can contain amine salt groups. Typically, this can be incorporated into the particle by forming the amine salt of the acid associated with the ethylenically unsaturated polyurethane. The acid groups can be at least partially neutralized, i.e., at least 30 percent of the total neutralization equivalent, by an inorganic base such as sodium hydroxide or an amine, particularly a volatile amine. Examples of suitable amines are ammonia, dimethylamine, trimethylamine, monoethanolamine and dimethylethanolamine. By carboxylic acid functionality is meant carboxylic acid as well as salts thereof.

The ethylenically unsaturated polyurethanes typically comprise from 30 to 60 percent by weight of the ethylenically unsaturated compounds used in the preparation of the polymeric particles and ethylenically unsaturated monomers comprise from 40 to 70 percent by weight of the ethylenically unsaturated compounds; the percentages by weight being based on total weight of the ethylenically unsaturated compounds.

The aqueous thermosetting coating compositions also contain a water-dispersible polycarbodiimide that is reactive with the carboxylic acid functionality in the polymeric particles during dehydration and amine volatilization of the basecoat(s) layer(s) to form a crosslinked coating.

"Water dispersible" and like terms, when used in conjunction with carbodiimide, refer to carbodiimide dissolved or dispersed in aqueous phase. In order to utilize certain carbodiimides in the present invention, it may be necessary to modify the carbodiimides to make them water dispersible. Techniques for modifying carbodiimides to make them water dispersible are well known in the art.

Suitable water dispersible carbodiimide crosslinkers include an aliphatic and/or cycloaliphatic dinitrogen analogue of carbonic acid of the generalized structure: $RN=C=NR_1$ where R and $R_1$ are independently aliphatic or cycloaliphatic groups. The aliphatic groups can comprise 1-6 carbon atoms. Examples include dibutyl carbodiimide and dicyclohexyl carbodiimide. Oligomeric or polymeric carbodiimide crosslinkers can also be used. Examples of such materials are disclosed in US 2009/0246393A1. Aliphatic carbodiimides are particularly useful when the waterborne coating composition is used as a monocoat.

The preparation of water dispersible carbodiimide crosslinkers is well known in the art. Suitable water dispersible carbodiimide crosslinkers can be prepared by incorporating minor amounts of an amine, such as dimethyl aminopropylamine, and an alkyl sulfonate or sulfate into the carbodiimide structure. Suitable water dispersible carbodiimides can also be prepared by incorporating polyethylene oxide or polypropylene oxide into the carbodiimide structure.

Suitable water dispersible carbodiimides are commercially available. For example, UCARLINK XL-29SE, XL-20 is commercially available from Union Carbide and CARBODILITE VO2-L2 is commercially available from Nisshinbo Industries, Inc.

The equivalent ratio of carbodiimide to carboxylic acid is typically 0.5 to 1.5:1, such as 08 to 1.2:1. The amount of the dispersed carbodiimide in the aqueous medium can be at least 1 percent by weight, such as from 1 to 50 percent, typically 5 to 25 percent by weight based on weight of resin solids of the curable aqueous composition.

In alternative embodiments of the present invention, the coating layer is deposited from a waterborne coating composition comprising:
(a) a continuous phase comprising water, and
(b) a dispersed phase comprising:
  (i) pigments;
  (ii) polymeric particles prepared from the polymerization of a mixture of ethylenically unsaturated compounds including ethylenically unsaturated monomers comprising from:
    (A) 2 to 30 percent by weight of a multi-ethylenically unsaturated monomer and
    (B) at least 30 percent by weight of an aldo or keto group-containing ethylenically unsaturated monomer, the percentages by weight being based on total weight of the ethylenically unsaturated monomers; and
  (iii) a polyhydrazide.

The aldo or keto group containing ethylenically unsaturated monomer is reactive with the polyhydrazide upon dehydration of the coating composition, resulting in a cured or crosslinked coating. Examples of such monomers include (meth)acrolein, diacetone (meth)acrylamide, acetoacetoxyethyl (meth)acrylate and vinyl acetoacetate. The aldo or keto group containing ethylenically unsaturated monomer is typically present in an amount of at least 30 percent by weight based on total weight of ethylenically unsaturated monomers. Amounts less than 30 percent are undesirable because of poor physical properties such as solvent resistance and humidity resistance. Typically, amounts greater than 60 percent by weight are not used because of the need to incorporate other ethylenically unsaturated monomers as described below to obtain the physical and chemical properties required for automotive quality coatings.

Besides the ethylenically unsaturated monomers mentioned above, alkyl esters of (meth)acrylic acid are usually used in the preparation of the polymeric particles. Typically, these monomers contain from at least 4, such as 4 to 10 carbon atoms, and at least 6, such as 6 to 10 carbon atoms in the alkyl group. These monomers are typically present in amounts of 4 to 40 percent by weight based on total weight of ethylenically unsaturated monomers, and may be any of those disclosed above.

Other ethylenically unsaturated monomers may also be used such as hydroxyalkyl esters of (meth)acrylic acid such as hydroxyethyl and hydroxypropyl (meth)acrylate; alkyl esters of (meth)acrylic acid having 1 to 2 carbon atoms in the alkyl group such as methyl (meth)acrylate; acid group containing monomers such as (meth)acrylic acid; and vinyl aromatic monomers such as styrene and vinyl toluene. Amounts of 0 to 60 percent are again typical.

Ethylenically unsaturated polyurethanes such as those disclosed above are also suitable.

For enhanced dispersion stability, the polymeric particles can contain amine salt groups as noted above.

A polyhydrazide that is a material containing two or more hydrazide groups is also present in the curable aqueous coating composition. The hydrazide group is very polar and usually the polyhydrazide will be in the aqueous phase. However, hydrophobic polyhydrazides may be in the dispersed phase. The polyhydrazides are reactive with the keto or aldo functionality present in the polymeric particles during dehydration of the basecoat(s) layer(s) to form a crosslinked coating. The polyhydrazide compounds suitable for this invention have two or more hydrazino groups ($-NH-NH_2$) per molecule which bind directly to the carbon atoms of the aldo or keto group. Examples of these are maleic dihydrazide, fumaric dihydrazide, itaconic dihydrazide, phthalic dihydrazide, isophthalic dihydrazide, terephthalic dihydrazide, trimellitic trihydrazide, oxalic dihydrazide, adipic dihydrazide and sebacic dihydrazide, and others. The polyhydrazide compound typically has between 1 to 10 carbon atoms with an equivalent ratio of hydrazide to aldo or ketone being from 0.5 to 1.5:1, permitting the coating composition to crosslink to form the highly crosslinked cured film. The polyhydrazide compound is usually present in an amount between about 0.1 weight percent to about 3.0 weight percent, based on the total weight of the curable aqueous composition.

In certain embodiments, the waterborne coating compositions are essentially free of organic solvents. Such solvents tend to adversely affect the stability of the dispersions. By "essentially free" is meant that the solvent is not present in an appreciable amount and any that is present is incidental and has no effect on properties. Typically any solvent is present in an amount less than 2 percent by weight, based on the total weight of the composition. The waterborne coating compositions typically have a VOC less than 0.1.

The coating composition may be applied to the substrate as a base coat, over which a transparent top coat or clear coat may be applied, or it may be a high gloss monocoat; that is, high gloss pigmented coating. By "high gloss" it is meant that the cured coating has a 20° gloss and/or a DOI ("distinctness of image") measurement of at least about 80 as measured by standard techniques known to those skilled in the art. Such standard techniques include ASTM D523 for gloss measurement and ASTM E430 for DOI measurement.

Coating compositions applied over the waterborne coating composition are preferably curable at temperatures lower than 90° C. In certain embodiments, the waterborne coating composition is applied as a first or second layer in a B1/B2 compact process.

In certain embodiments of the present invention, particularly when the substrate is an automotive body part, the substrate may further comprise a primer coating layer applied on the surface of the substrate. The primer coating layer may comprise any primer composition known in the art; in an automotive application, the primer is typically a curable composition. The primer can comprise a resinous binder and a pigment and/or other colorant, as well as optional additives well known in the art of coating compositions. Nonlimiting examples of resinous binders are acrylic polymers, polyesters, alkyds, and polyurethanes.

The aqueous curable composition can be formulated by blending the dispersion of the polymeric particles, the polyhydrazide or polycarbodiimide (unless it has been previously incorporated with the other ingredients with low shear mixing). The composition can be applied to the substrate by conventional techniques such as spraying, brushing and roll coating. The coated substrate is then dried at ambient temperature, that is, 20-25° C., or may be heated to 90° C., often up to 60° C., to cure the composition. The curing time will vary depending on the temperature and relative humidity. Typically, curing times are from 5 to 120 minutes.

The following examples are intended to illustrate various embodiments of the invention, and should not be construed as limiting the invention in any way.

EXAMPLES

Example A

This example illustrates the preparation of an acrylic latex, prepared in two parts:

Part 1: Polyurethane

A mixture containing a polyurethane acrylate prepolymer was prepared by adding 100 g of 2-ethylhexyl acrylate (EHA), 79.2 g of hydroxyethyl methacrylate, 81.6 g of dimethylol propionic acid, 1.5 g of 2,6-di-tert-butyl 4-methyl phenol, 0.8 g of triphenyl phosphite, 4 g triethyl amine and 0.8 g of dibutyl tin dilaurate to a four necked round bottom flask fitted with a thermocouple, mechanical stirrer, and condenser and heated to 90° C. to obtain a homogeneous solution. Then 405.5 g of polytetrahydrofuran molecular weight 1000 was added. To this mixture at 90° C., isophorone diisocyanate 225.4 g was added over 90 minutes. The isocyanate container was rinsed with 20.0 g of EHA. The reaction mixture was stirred at 90° C. until all the isocyanate groups were reacted. Then 454.0 g of ERA and 72.5 g of propylene glycol monomethyl ether was added and cooled to ambient temperature.

Part 2: Polyurethane Acrylic Latex

For the purpose of control, a polyurethane acrylic latex with no keto ethylenically unsaturated monomer, and 5.5% multi-ethylenically unsaturated monomer was prepared as follows:

Ten (20.0) g of Aerosol OT-75 (surfactant from Cytec Industries), 14.0 g of dimethyl ethanolamine, 369 g of prepared polyurethane/EHA mixture of Example A', 14.5 g of 1,6-hexanediol diacrylate, 97.0 g methyl methacrylate and 711 g of deionized water were charged to a four necked round bottom flask fitted with a thermocouple, mechanical stirrer, and condenser and heated to 33° C. to obtain a homogeneous solution. 0.45 g of t-butylhydroperoxide and 18.6 g of deionized water was then charged into the flask and mixed for 10 minutes. After that, 0.009 g of ferrous ammonium sulfate, 0.45 g of sodium metabisulfite and 18.6 g of deionized water were charged over 30 minutes. During this charge, exotherm was expected. After peak exotherm, the system was held at 65° C. for 1 hour. After it cooled to 45° C., 4.3 g of acticide MBS (biocide from Thor GmbH), 0.23 g of FOAMKILL 649 (defoamer from Crucible Chemical Co.) and 9.6 g of deionized water were charged into the flask and mixed for 15 minutes.

Example 1 illustrates the preparation of a coating composition in accordance with the present invention. Examples 2 and 3 are comparative.

|  | Example 1 | Example 2 | Example 3 |
|---|---|---|---|
| Latex of Example A | 150 g | 150 g | 150 g |
| TEGO WET 280 | 1 g | 1 g | 1 g |
| Black Tint 88B2792 | 40 g | 40 g | 40 g |
| BYK 011 | 0.11 g | 0.11 g | 0.11 g |
| MASURF FS 230 | 0.6 g | 0.6 g | 0.6 g |
| Propylene glycol | 2 g | 2 g | 2 g |
| CARBODILITE V-02-L2 | 15 g | — | — |
| RESIMINE HM 2608 | — | 21 g | — |

*TEGO WET 280 is a water compatible silicone flow aid and is available from Evonik
*Black Tint 86B2792 is available from PPG Industries, Inc.
*BYK 011 is an anti-gassing agent available from BYK Chemie
*MASURF FS 230 is a fluorinated anti-crater additive available from the Mason Chemical Company
*CARBODILITE V-02-L2 is available from GSI Exim America, Inc.
*RESIMINE HM 2608 is an aminoplast crosslinking agent available from Monsanto Chemical Co.

The base coat compositions of Examples 1-3 were applied to an epoxy composite substrate reinforced with carbon fibers and cured at various temperatures as noted below. The base coat compositions of the examples were tested as base coats alone and as part of a multi-component composite coating composition with a clear coat deposited over the base coat.

As Standalone Basecoat:

|  | Example 1 | Example 2 | Example 3 |
|---|---|---|---|
| FMH (180° F./15' bake) | 55 | 1 | 1 |
| Initial CAP 2000 viscosity | 27 | 26 | 37 |
| CAP visc after 3 months @ room temp - stability | 30 | 26 | 42 |
| Adhesion | 5B | 5B | 5B |
| MEK double rubs with 140° F./15' bake | 50 | 0 | 0 |
| MEK double rubs with 180° F./15' bake | 100 | 0 | 0 |

*FMH is Fischer MicroHardness testing - determined in accordance with ISO 14577 using a Fischer Technologies H100C Microhardness Measurement System
*CAP 2000 viscosity is measured using a high shear rate variable speed viscometer Conclusion—the data above evidence that the carbodiimide in a basecoat type formula (Example 1) cures very well at 140 and 180° F. Further work was performed on the above basecoats but with clearcoats over them; test results are shown below.

In Base/Clear Scenario:

|  | Example 1 | Example 2 | Example 3 |
|---|---|---|---|
| DCU 4000*<br>Room Temp<br>cure | 20° gloss - 89<br>FMH - 48<br>MEK rubs - +200 | 20° gloss - 88<br>FMH - 11<br>MEK rubs - +200 | 20° gloss - 89<br>FMH - 18<br>MEK rubs - +200 |
| Global Tech*<br>285° F. 30'<br>bake | 20° gloss - 82<br>FMH - 71<br>MEK rubs - +200 | 20° gloss - 81<br>FMH - 79<br>MEK rubs - +200 | 20° gloss - 80<br>FMH - 58<br>MEK rubs - +200 |
| High Tech*<br>285° F. 30'<br>bake | 20° gloss - 88<br>FMH - 110<br>MEK rubs - +200 | 20° gloss - 92<br>FMH - 99<br>MEK rubs - +200 | 20° gloss - 90<br>FMH -108<br>MEK rubs - +200 |

*tested after 2 weeks at room temp. panel storage

DCU 4000 is a refinish clear coat available from PPG Industries, Inc.

Global Tech is an epoxy based OEM clear coat available from PPG Industries, Inc.

High Tech is a melamine cure OEM clear coat available from PPG Industries, Inc.

Conclusion—the data above evidence that the carbodiimide base coats with clearcoats over them demonstrate adequate gloss and hardness properties, comparable to conventional base coat/clear coat systems.

What is claimed is:

1. A waterborne coating composition comprising:
   (a) a continuous phase comprising water, and
   (b) a dispersed phase comprising:
      (i) pigments;
      (ii) polymeric particles prepared from the polymerization of a mixture of ethylenically unsaturated compounds including an ethylenically unsaturated polyurethane and ethylenically unsaturated monomers comprising:
         (A) 2 to 30 percent by weight of a multi-ethylenically unsaturated monomer and
         (B) at least 30 percent by weight of an aldo or keto group-containing ethylenically unsaturated monomer, the percentages by weight being based on total weight of the ethylenically unsaturated monomers; and
      (iii) a polyhydrazide.

2. The composition of claim 1 in which the ethylenically unsaturated polyurethane is prepared by reacting a polyisocyanate with a polyol containing carboxylic acid functionality and a hydroxyl group-containing ethylenically unsaturated monomer.

3. The composition of claim 2 in which the ethylenically unsaturated polyurethane makes up 30 to 60 percent by weight of the mixture of ethylenically unsaturated compounds and the ethylenically unsaturated monomers make up 40 to 70 percent by weight of the mixture of ethylenically unsaturated compounds; the percentages by weight being based on total weight of the ethylenically unsaturated compounds.

4. The composition of claim 1 in which the polyhydrazide comprises at least one of maleic dihydrazide, fumaric dihydrazide, itaconic dihydrazide, phthalic dihydrazide, isophthalic dihydrazide, terephthalic dihydrazide, trimellitic trihydrazide, oxalic dihydrazide, adipic dihydrazide and sebacic dihydrazide.

5. The composition of claim 1 in which the ethylenically unsaturated monomers comprise from 4 to 40 percent by weight of an alkyl ester of (meth)acrylic acid having at least 6 carbon atoms in the alkyl group; the percentages by weight being based on total weight of the ethylenically unsaturated monomers.

6. The composition of claim 5 wherein upon application of the composition to a substrate as a coating and after curing by reaction of the polyhydrazide with the keto or aldo groups, the composition demonstrates a $T_g$ less than 25° C.

7. The composition of claim 1 in which the polymeric particles contain amine salt groups.

8. The composition of claim 1 in which the equivalent ratio of hydrazide groups in the polyhydrazide to aldo or keto groups is from 0.5 to 1.5:1.

* * * * *